United States Patent [19]

Granig

[11] 4,268,065
[45] May 19, 1981

[54] DEVICE FOR DISCHARGING PRESSURE GAS RESERVOIRS

[76] Inventor: Hubert Granig, Feldkirchnerstr. 30/87, Klagenfurt (Kärnten), Austria

[21] Appl. No.: 920,069

[22] Filed: Jun. 28, 1978

[30] Foreign Application Priority Data

Jul. 4, 1977 [AT] Austria ............................. 84750/77

[51] Int. Cl.³ ........................................... B60R 21/08
[52] U.S. Cl. .................................. 280/737; 251/309
[58] Field of Search ............. 280/736, 737, 741, 742; 251/309, 312; 60/632, 635, 636

[56] References Cited

U.S. PATENT DOCUMENTS

| | | | |
|---|---|---|---|
| 3,095,901 | 7/1963 | Larson et al. | 280/736 |
| 3,744,816 | 7/1973 | Yamaguchi et al. | 280/737 |
| 3,900,211 | 8/1975 | Russell et al. | 280/737 |

*Primary Examiner*—Robert R. Song
*Attorney, Agent, or Firm*—Martin A. Farber

[57] ABSTRACT

A device for discharging pressure gas reservoirs e.g., for inflating inflatable saftety belts, comprises a shut-off valve, which is associated with the pressure gas reservoir and is arbitrarily or automatically movable to its open position, e.g., by an energy storage device.

8 Claims, 5 Drawing Figures

U.S. Patent  May 19, 1981  4,268,065
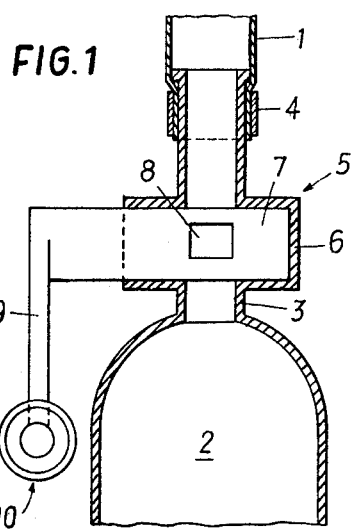
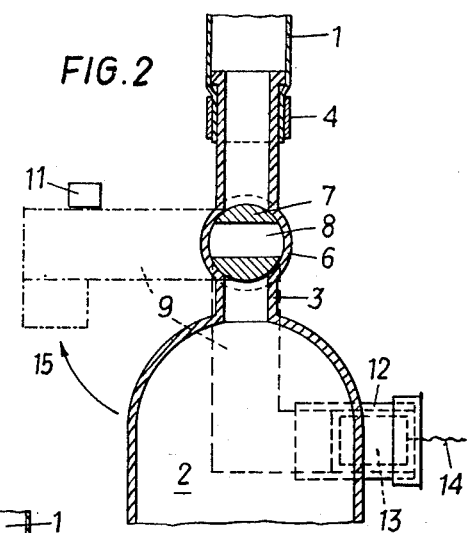
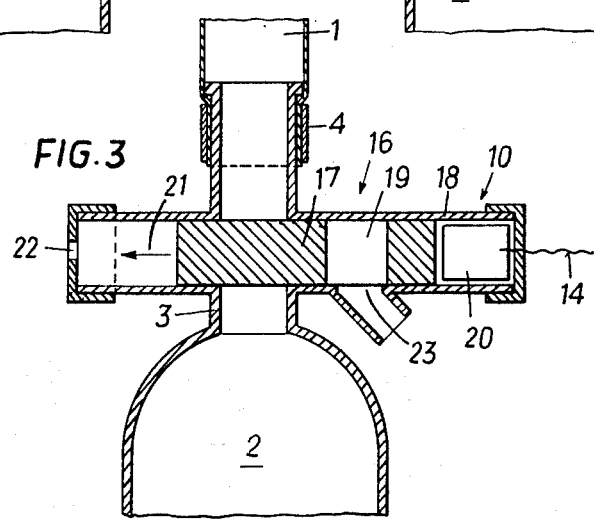
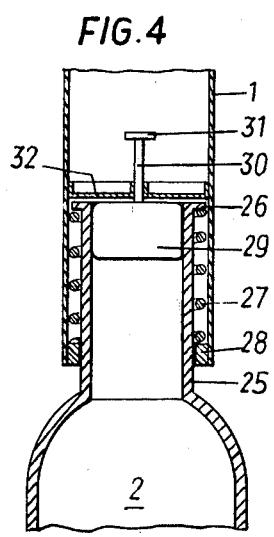
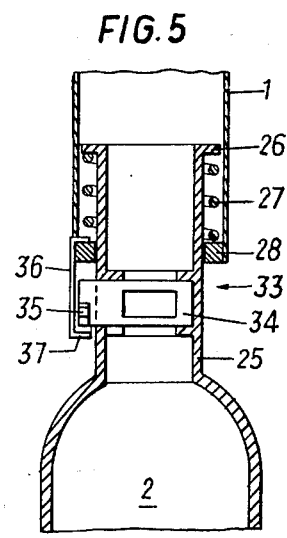

DEVICE FOR DISCHARGING PRESSURE GAS RESERVOIRS

This invention relates to a device for discharging pressure gas reservoirs, particularly for charging inflatable hollow bodies, such as safety belts or the like.

Particularly if the inflatable hollow bodies are safety belts or parts of safety belts, such as has been described, e.g., in Austrian Patent Specification No. 300,591, the hollow bodies cannot perform their safety function unless they are charged with compressed gas at the desired time substantially without delay. Whereas said Austrian patent specification suggests that closures of the pressure gas reservoir may be blasted off or explosive cartridges may be fired, this practice may have the disadvantage that not only the gas for inflating the hollow bodies but also residues from the combustion of the combustible mixture can enter the hollow body and from the latter into the interior of the motor vehicle.

For this reason it is an object of the invention to provide a device which is of the kind described first hereinbefore and is free from the above-mentioned disadvantage and yet permits of a reliable discharge of pressure gas reservoirs.

This is accomplished according to the invention in that a passage through which the pressure gas reservoir communicates with the hollow body is provided with a shut-off valve, which is automatically movable to its open position when it has been automatically or arbitrarily released.

It will be of advantage within the scope of the invention to provide a releasable energy storage device, which is adapted to act indirectly or directly on the valve and serves to move the same to its full-flow position. The energy storage device may consist, e.g., of a mechanical energy storage device, such as a spring and the like, or of an ignitable explosive powder cartridge and the like.

In a practical embodiment, the valve consists of a plug cock and the energy storage device is connected to an actuating lever, which is non-rotatably connected to the valve plug.

In another embodiment, the valve concists of a sliding valve and the energy storage device is directly connected to the slidable valve member. In this embodiment it has proved desirable to provide an energy storage device which consists of an ignitable cartridge and is contained in the valve housing itself and the latter has an aperture which preferably opens into the open and which is exposed by the slidable valve member when the latter is in its open position.

Further details and advantages of the invention will become apparent from the following description of embodiment shown diagrammatically and by way of example on the accompanying drawings, in which FIGS. 1 and 2 are sectional views showing a first embodiment FIG. 3 is a sectional view showing a second embodiment FIGS. 4 and 5 are sectional views of third and fourth embodiments, respectively.

In the embodiment shown in FIGS. 1 and 2, a hollow body, e.g., a safety belt, communicates with a pressure gas reservoir through a passage 3, which is defined by a tubular portion of the reservoir. The hollow body is fixed to the tubular portion 3 by means of a clip 4. In the embodiment shown by way of example, a valve consisting of a plug cock 5 is associated with the passage connected to the pressure gas reservoir 2. The housing 6 of the plug cock 5 is connected to the tubular portion 3 and extends transversely thereto. A valve plug 7 is rotatably mounted in the housing 6 of the plug cock 5. The valve plug 7 is shown in closing position in FIGS. 1 and 2 and has a through bore 8. An actuating lever 9 is connected to the valve plug 7 and serves to actuate the plug cock 5. An energy storage device 10 is provided for actuating the lever 9. In the embodiment shown by way of example, the energy storage device 10 comprises a housing 12 and an explosive cartridge 13, which is adapted to be fired via leads 14. An angled portion of the actuating lever 9 extends into the forward end of the housing 12. When the cartridge 13 has been fired, the actuating lever is pivotally moved in the direction of the arrow 15 in FIG. 2 to the position which is shown in dotted lines in FIG. 2 and in which the lever 9 engages a stop 11. In this position, compressed gas can flow from the pressure gas reservoir 2 through the bore 8 into the hollow body 1 to inflate the latter.

In the embodiment shown in FIG. 3, the shut-off valve consists of a sliding valve 16. The latter comprises a valve housing 18, which is connected to the tubular portion 3 by a pressure-tight joint, and a valve member 17 slidably mounted in the housing 18. The valve housing 18 contains also an explosive powder cartridge 20, which can be fired via a lead 14. When the cartridge 20 has been fired, the valve member 17 is displaced in the direction of the arrow 21 until the valve member 17 engages an end cap of the valve housing 18. In this position, the through bore 19 of the valve member 17 is aligned with the tubular portion 3 so that gas can flow out of the reservoir 2 into the hollow body 1. The end cap of the valve housing 18 has a bore 22 so that a pressure which could oppose the displacement of the valve member 17 cannot build up in the valve housing 18.

Adjacent to the powder cartridge 20, the housing 18 has an aperture 23 through which surplus expanding fluid from the powder cartridge 20 can escape into the open when the valve member has been displaced.

It is possible within the scope of the invention to actuate the opening mechanism by the tension force which acts, e.g., on a safety belt connected to the pressure gas reservoir, e.g., in case of an impact on the vehicle.

In this case the safety belt is directly coupled to the shut-off valve or to means for actuating said valve and is preferably arranged to actuate said valve or actuating means when the force acting on the belt or motor vehicle exceeds a predetermined limit. In this case the valve member or the mechanism for releasing the energy storage device may be actuated, e.g., against the resistance presented by a spring.

Two possible arrangements embodying this concept are diagrammatically shown in FIGS. 4 and 5.

The pressure gas reservoir 2 shown in FIG. 4 has a tubular extension 25, which carries a flange 26, on which a helical compression spring 27 abuts. The other end of the coil spring 27 engages a ring 28, which is slidably guided at the extension 25 and is connected to the safety belt 1. A cylindrical member 29 is disposed in the extension 25 in sealing engagement with the inside surfaces thereof. The member 29 carries a pin 30, which extends through an aperture in a disc 32 and has a head 31. The disc 32 is connected to the safety belt.

Under the action of a force exerted on the safety belt 1 in the upward direction in FIG. 4, the safety belt is displaced relative to the pressure gas reservoir and the coil spring 27 will be stressed at the same time. As soon as the head 31 is engaged by the disc 32, the member 29 will be displaced too and will finally open the extension 25 so that pressure fluid can flow out of the pressure gas reservoir 2 into the safety belt.

A similar arrangement is shown in FIG. 5. A shut-off valve consists of a plug cock 33, the plug 34 of which adapted to be actuated by an extension 35, which is carried by the plug 34 and engageable by a lever 36, which is coupled to the safety belt. In position of rest, there is a clearance between the laterally angled end portion 37 of the lever 36 and the extension 35 so that the plug 34 is not moved to its full-flow position until the safety belt 1 has been displaced to a predetermined extent relative to the pressure gas reservoir 2.

What is claimed is:

1. A device for discharging pressure gas from a pressure gas reservoir, comprising
    a discharge conduit defining a discharge passage adapted to communicate with said reservoir,
    a valve member associated with said passage and movable between shut-off and full-flow positions and arranged to close and open said passage in said shut-off and full-flow positions, respectively,
    actuating means releasable to move said valve member from said shut-off position to said full-flow position,
    said actuating means comprising an energy storage device operatively acting on said valve member,
    releasing means operable to release said actuating means for moving said valve member from said shut-off position to said full-flow position,
    said valve member consists of a rotatable valve plug, and
    said actuating means comprise a lever which is connected to said energy storage device and non-rotatably coupled to said plug.

2. A device as set forth in claim 1, which is connected between said pressure gas reservoir and an inflatable hollow body.

3. A device as set forth in claim 2, in which said hollow body is an inflatable safety belt.

4. A device as set forth in claim 1, in which said releasing means are automatically operable to release said valve when it is in said shut-off position.

5. A device as set forth in claim 1, in which said releasing means are arbitrarily operable to release said valve when it is in said shut-off position.

6. A device as set forth in claim 1, in which said energy storage device is operable to act indirectly on said valve member.

7. A device as set forth in claim 1, in which
    said energy storage device comprises an explosive powder cartridge and
    said release means comprise means for firing said cartridge.

8. The device as set forth in claim 1, wherein
    said actuating means is exclusive for moving said valve member independently of the pressure gas from said shut-off position into said full-flow position upon actuation of said releasing means, said actuating means is non-destructable exclusively of said energy storage device.

* * * * *